(12) United States Patent
Murai (10) Patent No.: US 11,548,557 B2
(45) Date of Patent: Jan. 10, 2023

(54) POWER UNIT MOUNTING STRUCTURE

(71) Applicant: TOYOTA JIDOSHA KABUSHIKI KAISHA, Aichi-ken (JP)

(72) Inventor: Daisuke Murai, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 283 days.

(21) Appl. No.: 16/751,251

(22) Filed: Jan. 24, 2020

(65) Prior Publication Data

US 2020/0283068 A1 Sep. 10, 2020

(30) Foreign Application Priority Data

Mar. 6, 2019 (JP) .............................. JP2019-040550

(51) Int. Cl.
*B62D 21/15* (2006.01)
*B62D 25/08* (2006.01)
*B60K 1/00* (2006.01)

(52) U.S. Cl.
CPC .............. *B62D 21/152* (2013.01); *B60K 1/00* (2013.01); *B62D 25/085* (2013.01)

(58) Field of Classification Search
CPC .... B62D 21/152; B62D 25/085; B62D 21/02; B62D 21/03; B60K 1/00; B60K 2001/0411
See application file for complete search history.

(56) References Cited

U.S. PATENT DOCUMENTS

| 2009/0026802 A1* | 1/2009 | Imada ................. B62D 21/152 |
| | | 296/187.11 |
| 2012/0031689 A1* | 2/2012 | Kanno ..................... B60K 1/00 |
| | | 180/65.1 |
| 2012/0031690 A1 | 2/2012 | Kanno |
| 2012/0038319 A1 | 2/2012 | Sekido et al. |

(Continued)

FOREIGN PATENT DOCUMENTS

| CN | 102458891 A | 5/2012 |
| CN | 106985777 A * | 7/2017 |

(Continued)

OTHER PUBLICATIONS

Unpublished U.S. Appl. No. 16/518,475, filed Jul. 22, 2019, 81pp.

*Primary Examiner* — James A Shriver, II
*Assistant Examiner* — Michael T. Walsh
(74) *Attorney, Agent, or Firm* — Hauptman Ham, LLP (57) ABSTRACT

There is provided a power unit mounting structure including: a power unit mounted at an upper side in a vehicle vertical direction relative to a pair of side members, the side members being spaced apart in a vehicle width direction at a vehicle front side or a vehicle rear side relative to a passenger compartment; a pair of upper side vehicle body structural members of which at least portions are disposed at outer sides in the vehicle width direction at the upper side in the vehicle vertical direction relative to the side members; and a brace that spans between the pair of upper side vehicle body structural members at the upper side in the vehicle vertical direction relative to the side members, the brace supporting a bottom portion of the power unit at the side thereof that is further from the passenger compartment in the vehicle front-and-rear direction.

10 Claims, 8 Drawing Sheets

(56) References Cited

U.S. PATENT DOCUMENTS

| | | | |
|---|---|---|---|
| 2012/0055721 A1 | 3/2012 | Matano | |
| 2014/0300126 A1* | 10/2014 | Ehrlich | B62D 25/025 |
| | | | 296/29 |
| 2017/0057546 A1* | 3/2017 | Dressel | B62D 21/152 |
| 2017/0166258 A1* | 6/2017 | Kim | B62D 25/082 |
| 2019/0054956 A1* | 2/2019 | Stenvall | B62D 25/08 |
| 2019/0152548 A1* | 5/2019 | Shimizu | B62D 65/12 |
| 2019/0232895 A1* | 8/2019 | Yamada | B60R 16/0215 |
| 2020/0047696 A1* | 2/2020 | Atsumi | B62D 25/084 |
| 2022/0081037 A1* | 3/2022 | Jeong | B62D 21/03 |
| 2022/0097767 A1* | 3/2022 | Jeong | B62D 25/082 |

FOREIGN PATENT DOCUMENTS

| | | | | |
|---|---|---|---|---|
| CN | 106985777 A | | 7/2017 | |
| DE | 102018108010 A1 | * | 11/2018 | ............ B62D 21/02 |
| DE | 102018113460 A1 | * | 2/2019 | ............ B60K 1/04 |
| EP | 1612126 A1 | * | 1/2006 | ............ B60R 19/56 |
| EP | 3135566 A1 | * | 3/2017 | ............ B22F 3/1055 |
| GB | 2490019 A | * | 10/2012 | ............ B62D 25/082 |
| JP | H07101353 A | * | 4/1995 | |
| JP | H7101353 A | | 4/1995 | |
| JP | 2010-861 A | | 1/2010 | |
| JP | 2011-20623 A | | 2/2011 | |
| JP | 2020050213 A | * | 4/2020 | ............ B62D 21/02 |
| WO | WO-2006080543 A1 | * | 8/2006 | ............ B62D 21/02 |
| WO | WO-2018151182 A1 | * | 8/2018 | ............ B62D 21/02 |
| WO | WO-2022157693 A1 | * | 7/2022 | |

\* cited by examiner

POWER UNIT MOUNTING STRUCTURE

CROSS-REFERENCE TO RELATED APPLICATION

This application is based on and claims priority under 35 USC 119 from Japanese Patent Application No. 2019-040550 filed on Mar. 6, 2019, the disclosure of which is incorporated by reference herein.

BACKGROUND

Technical Field

The present disclosure relates to a power unit mounting structure.

Related Art

Japanese Patent Application Laid-Open (JP-A) No. 2011-020623 discloses a structure in which a front side portion of an inverter is supported by a component-mounting frame member that is connected with left and right side members.

JP-A No. 2010-000861 discloses an inverter attachment structure in which a front portion of an inverter is attached to a front cross-member and a rear portion of the inverter is attached to a suspension tower bar.

However, in a structure in which a power unit is supported at a member that links between side members as in JP-A Nos. 2011-020623 and 2010-000861, when a collision load is applied in the vehicle front-and-rear direction, deformation (axial compression) of the side members is limited by the member. Therefore, the side members have less ability to absorb the collision load.

If the member linking between side members is removed from the structure recited in JP-A No. 2010-000861 in order to facilitate deformation of the side members, a portion of the power unit at the side thereof that is further from a passenger compartment is not supported. Thus, there is no member in the vicinity of a region of the power unit at the side thereof that is further from the passenger compartment. Therefore, when a collision load is applied in the vehicle front-and-rear direction, the collision load is likely to be applied to the power unit and the power unit may be vulnerable to deformation.

SUMMARY

In consideration of the circumstances described above, the present disclosure provides a power unit mounting structure that may suppress a reduction in the ability of a side member to absorb a collision load when the collision load is applied in a vehicle front-and-rear direction and that may suppress deformation of the power unit.

A power unit mounting structure according to a first aspect of the present disclosure includes: a power unit that is mounted at an upper side in a vehicle vertical direction relative to a pair of side members, the pair of side members being spaced apart in a vehicle width direction at a vehicle front side or a vehicle rear side relative to a passenger compartment; a pair of upper side vehicle body structural members, each having at least a portion that is disposed at an outer side in the vehicle width direction at the upper side in the vehicle vertical direction relative to the pair of side members; and a brace that spans between the pair of upper side vehicle body structural members at the upper side in the vehicle vertical direction relative to the pair of side members, the brace supporting a bottom portion of the power unit at a side thereof that is furthest from the passenger compartment in a vehicle front-rear direction.

In the power unit mounting structure of the first aspect, the brace that supports the power unit is disposed at the upper side relative to the side members and does not link between the pair of side members. Therefore, deformation of the pair of side members in the vehicle front-and-rear direction is not limited by the brace, and a reduction in the ability of the side members to absorb a collision load when the collision load is applied in the vehicle front-and-rear direction may be suppressed.

Furthermore, in the power unit mounting structure of the first aspect, the brace is disposed in the vicinity of a region of the power unit at the side thereof that is further from the passenger compartment (at the side at which the collision load is applied). Thus, when a collision load is applied in the vehicle front-and-rear direction, a portion of the collision load is transmitted to other regions via the brace. Therefore, less of the collision load is applied to the power unit and deformation of the power unit may be suppressed.

That is, in the power unit mounting structure of the first aspect, both a reduction in the ability of the side members to absorb a collision load when the collision load is applied in the vehicle front-and-rear direction may be suppressed and deformation of the power unit may be suppressed.

A power unit mounting structure according to a second aspect of the present disclosure further includes: an auxiliary member that, when viewed from the vehicle vertical direction, extends in the vehicle width direction at a side of the brace that is closest to the passenger compartment in the vehicle front-and-rear direction; and a beam member that extends in the vehicle front-rear direction, one end portion of the beam member in an axial direction being attached to the brace and another end portion of the beam member in the axial direction being supported by the auxiliary member, wherein the power unit is supported by the brace and the auxiliary member.

In the power unit mounting structure of the second aspect, because the power unit is supported by the brace and the auxiliary member, a support range of the bottom portion of the power unit is larger in the vehicle front-and-rear direction. Therefore, inclination of a central axis of the power unit relative to the vehicle vertical direction may be suppressed.

In a power unit mounting structure according to a third aspect of the present disclosure: the auxiliary member is a cross-member provided at a lower portion in the vehicle vertical direction of a panel, the panel dividing an accommodation compartment, which accommodates the power unit, from the passenger compartment; a bracket is provided at the cross-member, the bracket standing upright toward the vehicle upper side from the cross-member; and the other end portion of the beam member in the axial direction is attached to the bracket.

In the power unit mounting structure of the third aspect, a height level of the one end portion of the beam member changes when the bracket standing from the cross-member is changed. Thus, the height level of the one end portion of the beam member may be adjusted without replacement of the cross-member. Therefore, it is simple to adjust an angle of the beam member.

In a power unit mounting structure according to a fourth aspect of the present disclosure: the auxiliary member is a panel dividing an accommodation compartment, which accommodates the power unit, from the passenger compartment, an attachment-receiving portion being provided at the panel; and a rear end portion of the beam member is attached to the attachment-receiving portion.

In the power unit mounting structure of the fourth aspect, when a collision load in the vehicle front-and-rear direction is applied to the brace, the beam member braces against the collision load between the brace and the panel. Therefore, deformation of the brace may be suppressed, and deformation of the upper side vehicle body structural members that the brace spans between may be suppressed. Thus, a reduction in stiffness of the vehicle with respect to collision loads in the vehicle front-and-rear direction may be suppressed.

In a power unit mounting structure according to a fifth aspect of the present disclosure: the upper side vehicle body structural members include a pair of suspension towers that are spaced apart in the vehicle width direction and extend in the vehicle vertical direction; and the brace spans between the pair of suspension towers.

In the power unit mounting structure according of the fifth aspect, when a collision load in the vehicle front-and-rear direction is applied to one of the suspension towers, a portion of the applied collision load is transmitted through the brace to the other suspension tower. Therefore, compared to a structure that does not include the brace, deformation of the suspension towers may be suppressed, and stiffness of the suspension towers with respect to collision loads in the vehicle front-and-rear direction may be raised.

According to the present disclosure, both a reduction in the ability of the side members to absorb a collision load when the collision load is applied in the vehicle front-and-rear direction may be suppressed and deformation of the power unit may be suppressed.

BRIEF DESCRIPTION OF THE DRAWINGS

Exemplary embodiments of the present disclosure will be described in detail based on the following figures, wherein.

DETAILED DESCRIPTION

First Exemplary Embodiment

Figure 1:
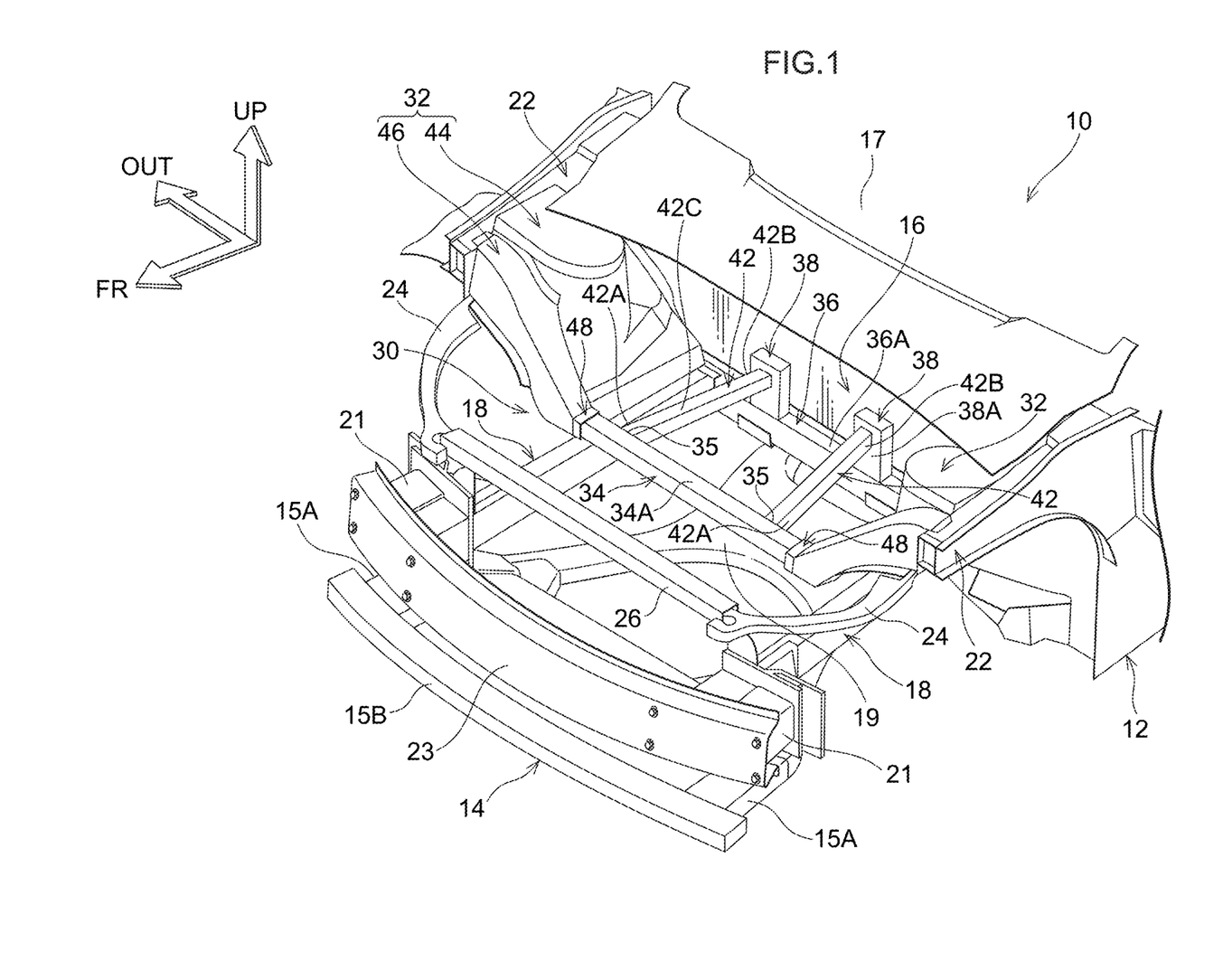
FIG. 1 is a perspective view showing principal elements of a vehicle front portion at which a power unit mounting structure according to a first exemplary embodiment is employed.

FIG. 1 shows interior structures of a front portion of a vehicle 10 in which a power unit mounting structure 30 according to the first exemplary embodiment is employed. A power unit 31, which is described below (see FIG. 2), is not shown in the drawing of FIG. 1. The vehicle 10 includes a vehicle body 12 and the power unit mounting structure 30.

In the drawings, the arrow FR indicates the vehicle front-and-rear direction front side, the arrow RR indicates the vehicle front-and-rear direction rear side, the arrow UP indicates the vehicle vertical direction upper side, and the arrow OUT indicates the vehicle width direction inner side. The vehicle front-and-rear direction, vehicle vertical direction and vehicle width direction are mutually orthogonal directions. Herebelow, where descriptions are given simply using the directions front, rear, up, down, left and right, unless otherwise specified, these represent front and rear in the vehicle front-and-rear direction, up and down in the vehicle vertical direction, and left and right in the vehicle width direction when facing in the progress direction.

—Overall Structure—

The vehicle body 12 includes a suspension member 14, a dash panel 16, front side members 18 and apron upper members 22. A motor 28 is mounted at the vehicle body 12 (see FIG. 2). The motor 28 drives front wheels of the vehicle 10, which are not shown in the drawings.

In a vehicle plan view, the suspension member 14 is formed substantially in a ladder shape. More specifically, the suspension member 14 includes a left and right pair of side rails 15A, which are spaced apart in the vehicle width direction and extend in the vehicle front-and-rear direction, and a plural number of cross-members including a cross-member 15B that link the left and right pair of side rails 15A in the vehicle width direction, which are not shown in the drawings.

The dash panel 16 extends in the vehicle vertical direction and the vehicle width direction, with a plate thickness direction in the vehicle front-and-rear direction, at the upper side in the vehicle vertical direction (below referred to as "the vehicle upper side") relative to the suspension member 14. The dash panel 16 divides an accommodation compartment 19 that accommodates the power unit 31 that is described below (see FIG. 2) from a passenger compartment 17 that serves as a riding space for vehicle occupants. That is, the accommodation compartment 19 is disposed at the vehicle front side relative to the dash panel 16, and the passenger compartment 17 is disposed at the vehicle rear side relative to the dash panel 16.

The front side members 18 are examples of a side member. The left and right pair of front side members 18 are spaced apart in the vehicle width direction at the vehicle front side relative to the passenger compartment 17. Each front side member 18 extends in the vehicle front-and-rear direction toward the vehicle front from the dash panel 16. The front side member 18 is a framework member with a chamber structure that is formed by extrusion molding, press machining or the like. A front bumper reinforcement 23 is provided at the front ends of the pair of front side members 18, with crash boxes 21 interposed.

A left and right pair of the apron upper members 22 are spaced apart in the vehicle width direction. Each of the pair of apron upper members 22 extends in the vehicle front-and-rear direction at the vehicle upper side at the vehicle width direction outer side relative to the corresponding front side member 18. A front end portion of the apron upper member 22 is connected to a portion of an apron brace, which is not shown in the drawings. The apron brace is connected to a front end portion of the front side member 18. One end portion of an inner extension 24 is connected to a portion of the apron upper member 22. Another end portion of the inner extension 24 is connected to a radiator support 26.

—Configuration of Principal Elements—

Now, the power unit mounting structure 30 is described.

The power unit mounting structure 30 includes, as an example, the power unit 31, a left and right pair of suspension towers 32, a brace 34, a dash cross-member 36, brackets 38 and beam mounts 42. The power unit mounting structure 30 is provided in the accommodation compartment 19.

Power Unit

The power unit 31 is an example of a high-voltage component, which distributes (supplies) electric power to various parts of the vehicle 10. The power unit 31 is mounted at the upper side in the vehicle vertical direction relative to the pair of front side members 18. A main body of the power unit 31 is formed in a hollow box shape. Power distribution components including circuits and the like, which are not shown in the drawings, are provided inside this main body.

Suspension Towers

The suspension towers 32 are examples of an upper side vehicle body structural member. Viewed in the vehicle vertical direction, the suspension towers 32 are provided at the vehicle width direction inner sides relative to the left and right apron upper members 22 but at the vehicle width direction outer sides relative to the front side members 18. The suspension towers 32 extend in the vehicle vertical direction. In other words, the suspension towers 32 are spaced apart in the vehicle width direction and extend in the vehicle vertical direction. The suspension towers 32 retain upper end portions of suspensions that support the front wheels, which are accommodated in wheel houses that are not shown in the drawings.

Figure 2:
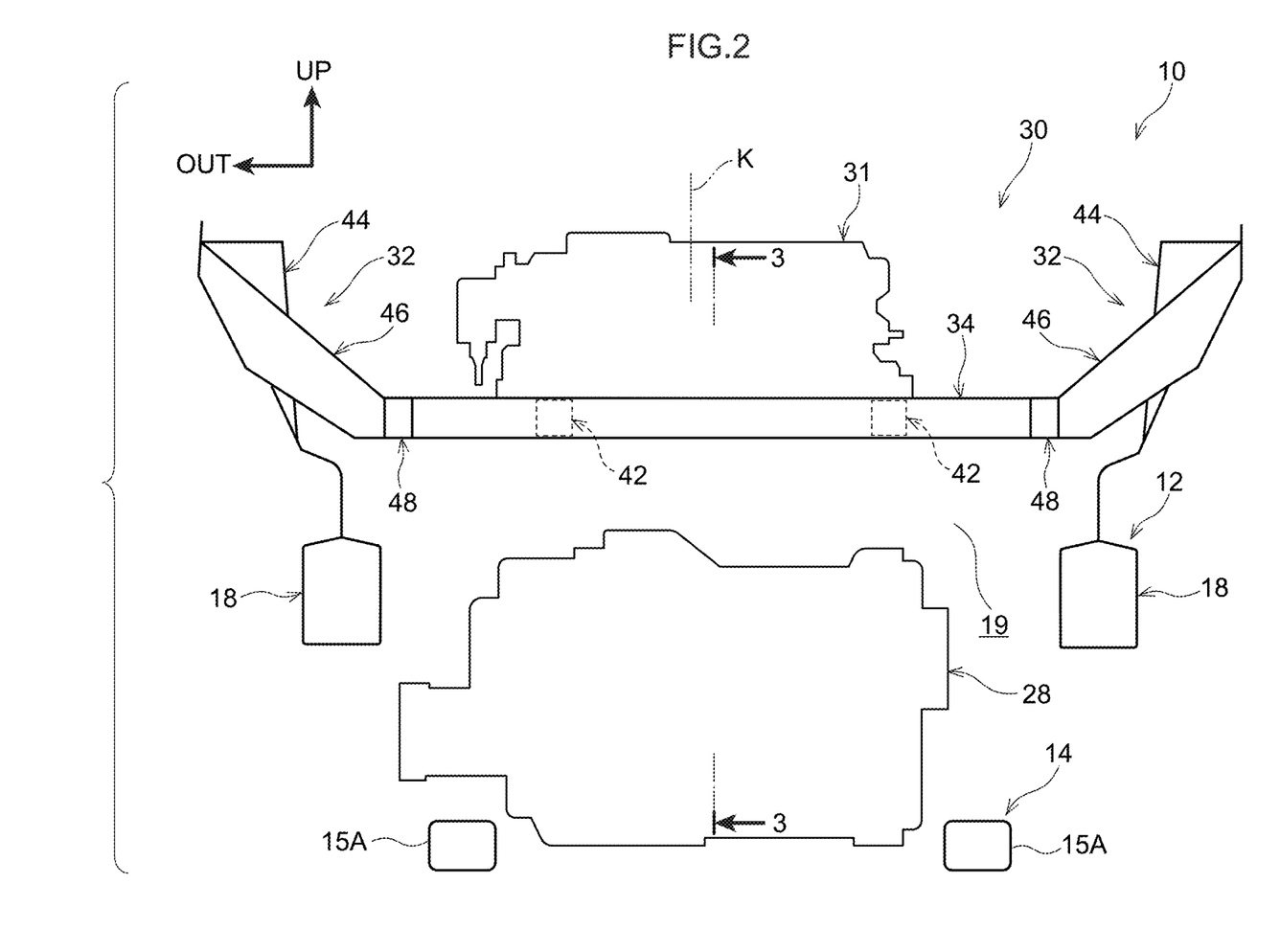
FIG. 2 is an elevation view showing the power unit mounting structure shown in FIG. 1 and vicinity portions thereof.

FIG. 2 shows the power unit mounting structure 30 and vicinity portions thereof in an elevation view seen from the vehicle front side. Shapes of some of the members are shown simplified. At each of the left side and the right side relative to the center in the vehicle width direction of the vehicle 10, a middle portion and upper portion in the vehicle vertical direction of the suspension tower 32 is disposed at the upper side relative to the front side member 18. Each suspension tower 32 is formed as an integral member by, for example, welding of a main body portion 44 and an arm portion 46.

The main body portion 44 is a portion that retains an upper end portion of the suspension that is not shown in the drawings. The main body portion 44 bulges toward the inner side in the vehicle width direction from the apron upper member 22 (see FIG. 1). The arm portion 46 extends toward the vehicle width direction inner side from a region of a front face of the main body portion 44 at the front side thereof in the vehicle front-and-rear direction. The left and right pair of arm portions 46 are arranged symmetrically with respect to the center in the vehicle width direction of the vehicle 10. The left and right pair of arm portions 46 are spaced apart in the vehicle width direction. A spacing distance thereof is smaller than a length in the vehicle width direction of the brace 34, which is described below.

Brace attachment portions 48 are formed at respective inner side end portions of the left and right pair of arm portions 46, which end portions oppose one another in the vehicle width direction. Viewed in the vehicle vertical direction, the left and right pair of brace attachment portions 48 are disposed at, for example, positions at the rear side relative to front end portions of the pair of front side members 18, at the inner sides in the vehicle width direction relative to the pair of front side members 18. Viewed in the vehicle front-and-rear direction, the left and right pair of brace attachment portions 48 are disposed at the upper side relative to the pair of front side members 18.

Brace

The brace 34 shown in FIG. 1 is a single member that extends with an axial direction in the vehicle width direction. The brace 34 spans between the pair of suspension towers 32 (the arm portions 46) at the vehicle upper side relative to the pair of front side members 18. More specifically, two end portions of the axial direction of the brace 34 are joined to the brace attachment portions 48. In the present exemplary embodiment, the meaning of two members being joined is intended to include the linking of two members by the use of any of bonding methods, fastening methods that utilize fastening members, and welding methods (including spot welding).

Figure 3:
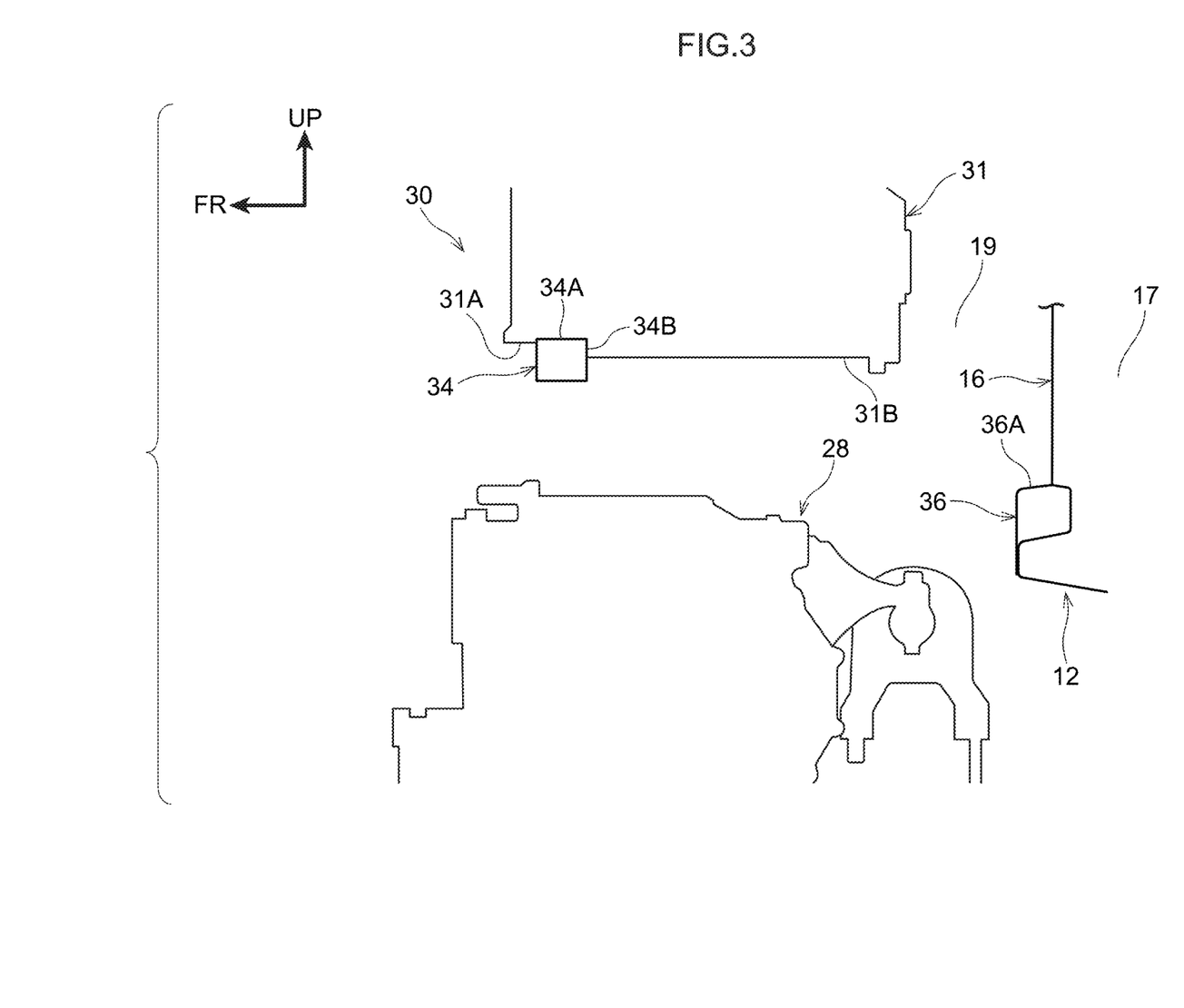
FIG. 3 is a vertical sectional view (a sectional view cut along line 3-3 in FIG. 2) of the power unit mounting structure shown in FIG. 2.

As shown in FIG. 3, a cross section of the brace 34 when viewed in the vehicle width direction is formed in, for example, a square tube shape including an upper face 34A along the vehicle front-and-rear direction and a rear side face 34B along the vehicle vertical direction. That is, the brace 34 is formed as a hollow member. A front portion of the power unit 31 at the front side relative to the middle thereof in the vehicle front-and-rear direction is placed on the upper face 34A. That is, the brace 34 supports a bottom portion 31A of the power unit 31 that is at the opposite side of the power unit 31 in the vehicle front-and-rear direction from the side thereof at which the passenger compartment 17 is disposed (which opposite side is a side at which a collision load is applied).

A bottom portion 31B of the power unit 31 is at the side thereof that is closer to the passenger compartment 17 in the vehicle front-and-rear direction. In the first exemplary embodiment, the meaning of the bottom portion 31B is intended to include a bottom region of a rear portion of the power unit 31 that is at the rear side relative to the middle of the power unit 31 in the vehicle front-and-rear direction. In summary, the bottom portion 31B at the side of the power unit 31 that is closer to the passenger compartment 17 in the vehicle front-and-rear direction is a bottom region of a rear portion of the power unit 31, and the bottom portion 31A at the side that is further from the passenger compartment 17 is a bottom region of a front portion of the power unit 31.

Plural penetrating holes for fastening, which are not shown in the drawings, are formed in the upper face 34A. At plural locations in the vehicle width direction of the front portion of the power unit 31, the front portion is fastened (fixed) to the brace 34 using plural bolts, which are not shown in the drawings. Attachment-receiving portions 35 (see FIG. 1) are specified at two locations of the rear side face 34B of the brace 34, which are spaced apart in the vehicle width direction. The attachment-receiving portions 35 are portions at which front end portions of the beam mounts 42, which are described below, are joined.

Dash Cross-Member

The dash cross-member 36 is an example of an auxiliary member and a cross-member. The dash cross-member 36 is provided at (joined to) a lower portion of the dash panel 16 that is at the lower side relative to the center of the dash panel 16 in the vehicle vertical direction. Viewed in the vehicle width direction, a cross section of the dash cross-member 36 is formed in, for example, a substantially pentagonal tube shape including an upper face 36A along the vehicle front-and-rear direction. That is, the dash cross-member 36 is formed as a hollow member with a chamber cross section.

As shown in FIG. 1, the dash cross-member 36 extends in the vehicle width direction from a rear end portion of the front side member 18 at one side in the vehicle width direction (the right side) to a rear end portion of the front side member 18 at the other side (the left side). That is, when viewed in the vehicle vertical direction, the dash cross-member 36 extends in the vehicle width direction at the side of the brace 34 that is closer to the passenger compartment 17 in the vehicle front-and-rear direction.

The two end portions in the vehicle width direction of the dash cross-member 36 are connected to the vehicle width direction inner side faces of the rear end portions of the pair of front side members 18. Therefore, the dash cross-member 36 suppresses inclination of the pair of front side members 18 to the vehicle width direction inner sides thereof Brackets As an example, two of the brackets 38 are provided at the upper face 36A of the dash cross-member 36, spaced apart in the vehicle width direction. A spacing distance of the brackets 38 in the vehicle width direction is smaller than a spacing distance of the attachment-receiving portions 35. The two brackets 38 stand toward the vehicle upper side from the dash cross-member 36. The two brackets 38 are arranged with left-right symmetry about the center in the vehicle width direction of the vehicle 10. More specifically, the brackets 38 are formed in hollow cuboid shapes.

A depth of each bracket 38 in the vehicle front-and-rear direction is, for example, substantially the same as a depth of the upper face 36A in the vehicle front-and-rear direction. When the bracket 38 is viewed in the vehicle front-and-rear direction, the profile of a front face 38A thereof is, for example, a rectangular shape that is longer in the vehicle vertical direction and shorter in the vehicle width direction. A join-receiving portion, which is not shown in the drawings, is formed at the front face 38A. A rear portion of the corresponding beam mount 42, which is described below, is joined to the join-receiving portion.

Beam Mounts

The beam mounts 42 are examples of a beam member. Two of the beam mounts 42 are provided spaced apart in the vehicle width direction. The two beam mounts 42 are arranged with left-right symmetry about the center in the vehicle width direction of the vehicle 10. Each beam mount 42 is formed as a member with a substantially square tube shape that is long in one direction. Viewed in the vehicle vertical direction, the profile of an upper face of the beam mount 42 is formed in a parallelogram shape. A height level of the beam mount 42 in the vehicle vertical direction is, for example, substantially the same as a height level of the brace 34 in the vehicle vertical direction.

More specifically, viewed in the vehicle front-and-rear direction, the beam mount 42 extends with an axial direction in a diagonal direction that intersects the vehicle front-and-rear direction such that one end portion of the axial direction (a front end portion 42A of the beam mount 42 in the vehicle front-and-rear direction) is disposed to the outer side in the vehicle width direction relative to the other end portion of the axial direction (a rear end portion 42B). Viewed in the vehicle width direction, the beam mount 42 extends in the vehicle front-and-rear direction.

The front end portion 42A is attached (joined) to the corresponding attachment-receiving portion 35 of the brace 34. The rear end portion 42B is attached (joined) to an upper portion of the front face 38A of the bracket 38. In other words, the rear end portions 42B are indirectly supported by the dash cross-member 36 via the brackets 38.

Viewed in the vehicle vertical direction, the two beam mounts 42 are disposed so as to form the diagonal edges of a trapezoid of which the short base edge is at the dash cross-member 36 side and the long base edge is at the brace 34 side. A height level in the vehicle vertical direction of an upper face 42C of each beam mount 42 is, for example, aligned to substantially the same height level as the upper face 34A. Thus, the power unit 31 (see FIG. 2) may be placed on the beam mounts 42.

Thus, the power unit 31 (see FIG. 2) is mounted at the vehicle upper side relative to the pair of front side members 18. The power unit 31 is supported by the brace 34 and the dash cross-member 36. As shown in FIG. 3, viewed in the vehicle width direction, the front end of the power unit 31 is disposed at the rear side in the vehicle front-and-rear direction relative to the front end of the motor 28.

—Operation and Effects—

Now, operation of the power unit mounting structure 30 according to the first exemplary embodiment is described.

In the power unit mounting structure 30 shown in FIG. 1 to FIG. 3, the brace 34 that supports the power unit 31 is disposed at the upper side relative to the pair of front side members 18 and does not link between the pair of front side members 18. Therefore, deformation of the pair of front side members 18 in the vehicle front-and-rear direction is not limited by the brace 34. Thus, a reduction in the ability of the front side members 18 to absorb a collision load when the collision load is applied in the vehicle front-and-rear direction may be suppressed.

In the power unit mounting structure 30, the brace 34 is disposed in a vicinity of the front portion of the power unit 31 that is at the side thereof that is further from the passenger compartment 17. Therefore, when a collision load is applied in the vehicle front-and-rear direction, a portion of the collision load is transmitted to other regions (the vehicle body 12) via the brace 34. Therefore, the collision load that is applied to the power unit 31 is reduced and deformation of the power unit 31 may be suppressed. That is, in the power unit mounting structure 30, both a reduction in the ability of the front side members 18 to absorb a collision load when the collision load is applied in the vehicle front-and-rear direction may be suppressed and deformation of the power unit 31 may be suppressed.

In the power unit mounting structure 30, because the power unit 31 is supported by the brace 34 and the dash cross-member 36, a support range of the bottom portions 31A and 31B of the power unit 31 is larger in the vehicle front-and-rear direction. Therefore, inclination of a central axis of the power unit 31 (an imaginary axis K extending through the center of gravity thereof in the height direction (see FIG. 2)) relative to the vehicle vertical direction may be suppressed.

In the power unit mounting structure 30, the height levels of one end portions (the rear end portions) of the beam mounts 42 change when the brackets 38 are changed. Thus, the height levels of the one end portions of the beam mounts 42 may be adjusted without replacement of the dash cross-member 36, which is larger than the brackets 38. Therefore, it is simple to adjust angles of the beam mounts 42.

In the power unit mounting structure 30, when a collision load in the vehicle front-and-rear direction is applied to one of the suspension towers 32, a portion of the applied collision load is transmitted through the brace 34 to the other suspension tower 32. Therefore, compared to a structure that does not include the brace 34, deformation of the suspension towers 32 may be suppressed, and stiffness of the suspension towers 32 with respect to collision loads in the vehicle front-and-rear direction may be raised.

In the power unit mounting structure 30, viewed in the vehicle width direction, the front end of the power unit 31 is disposed at the rear side in the vehicle front-and-rear direction relative to the front end of the motor 28. Therefore, when a front collision occurs, a deformed front portion of the vehicle body 12 is more likely to come into contact with the motor 28 prior to the power unit 31 than in a structure in which the front end of the power unit 31 is disposed at the front side relative to the front end of the motor 28. Thus, the power unit 31 may be protected.

Second Exemplary Embodiment

Now, a power unit mounting structure 50 according to a second exemplary embodiment is described.

Figure 4:
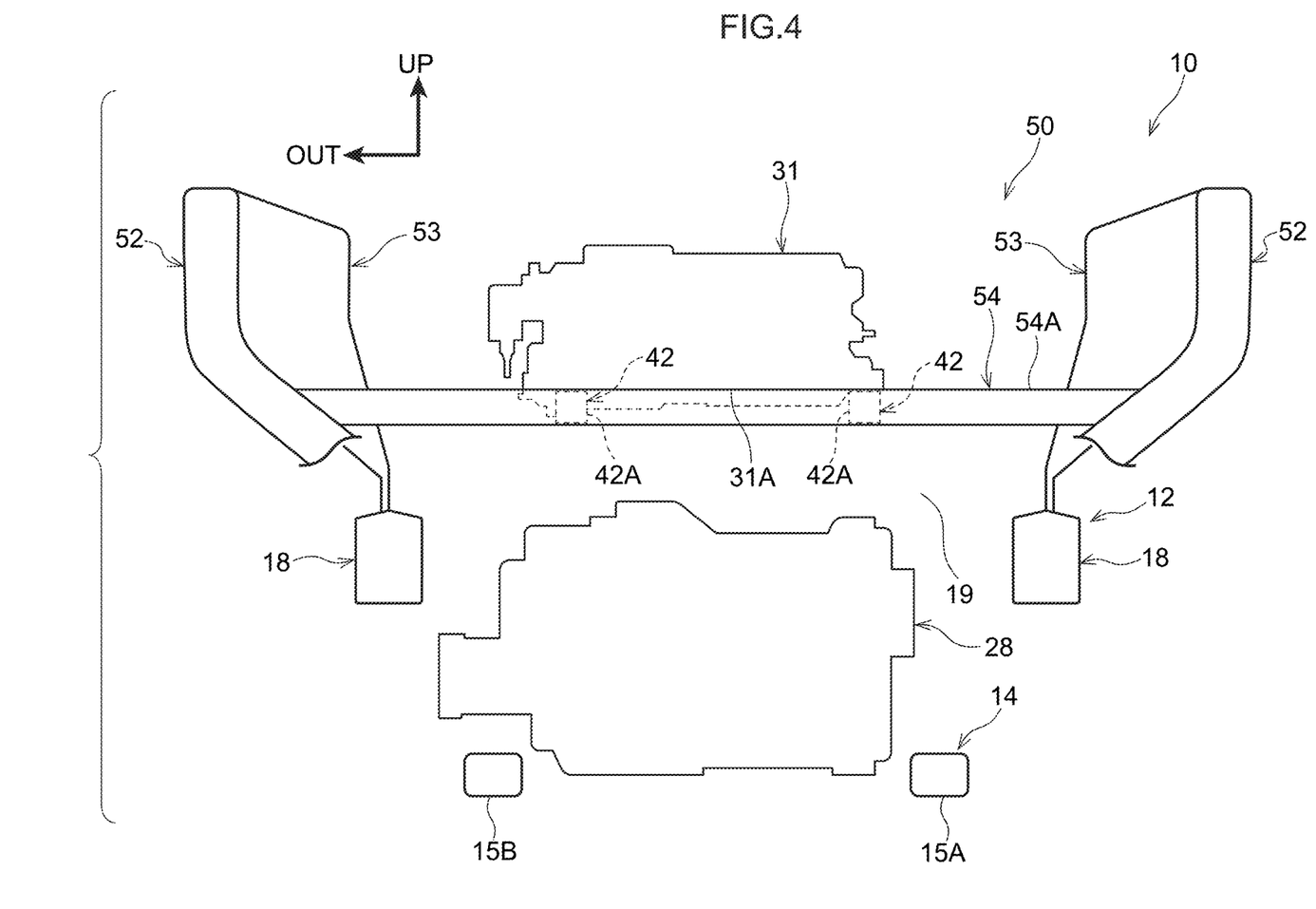
FIG. 4 is an elevation view showing a power unit mounting structure according to a second exemplary embodiment and vicinity portions thereof.

The power unit mounting structure 50 shown in FIG. 4 is provided in place of the power unit mounting structure 30 (see FIG. 1) in the vehicle 10 according to the first exemplary embodiment (see FIG. 1). Structures that are basically the same as in the vehicle 10 and the power unit mounting structure 30 are assigned the same reference symbols and descriptions thereof are not given here. The reference symbol of the vehicle is the same, "the vehicle 10".

The power unit mounting structure 50 includes, for example, the power unit 31, apron upper members 52, a brace 54, the dash cross-member 36 and brackets 38 (see FIG. 1), and the beam mounts 42. The power unit mounting structure 50 is provided in the accommodation compartment 19. Viewed in the vehicle width direction, the front end of the power unit 31 is disposed at the rear side in the vehicle front-and-rear direction relative to the front end of the motor 28. Viewed in the vehicle vertical direction, suspension towers 53 are provided between the apron upper members and the front side members 18.

Apron Upper Members

The apron upper members 52 are examples of the upper side vehicle body structural member. The apron upper members 52 are provided as a left and right pair spaced apart in the vehicle width direction. The pair of apron upper members 52 extend in the vehicle front-and-rear direction at the vehicle width direction outer sides at the vehicle upper side relative to the front side members 18. The whole of each apron upper member 52 is disposed at the vehicle upper side relative to the corresponding front side member 18. A front end portion of the apron upper member 52 is connected to a portion of an apron brace, which is not shown in the drawings. The apron brace is connected to a front end portion of the front side member 18.

Brace

The brace 54 is a single member that extends with an axial direction in the vehicle width direction. The brace 54 spans between the pair of apron upper members 52 at the vehicle upper side relative to the pair of front side members 18. More specifically, two end portions of the axial direction of the brace 54 are joined to inner side faces of the left and right apron upper members 52. The inner side faces are axial direction (extension direction) portions of the apron upper members 52 and oppose one another in the vehicle width direction.

A cross section of the brace 54 when viewed in the vehicle width direction is formed in, for example, a square tube shape including an upper face 54A and a rear side face that is not shown in the drawings. That is, the brace 54 is formed as a hollow member. A front portion in the vehicle front-and-rear direction of the power unit 31 is placed on the brace 54. That is, the brace 54 supports the bottom portion 31A of the power unit 31 that is at the opposite side of the power unit 31 in the vehicle front-and-rear direction from the side thereof at which the passenger compartment 17 (see FIG. 1) is disposed (which opposite side is a side at which a collision load is applied).

Plural penetrating holes for fastening, which are not shown in the drawings, are formed in the upper face 54A. At plural locations in the vehicle width direction of the front portion of the power unit 31, the front portion is fastened (fixed) to the brace 54 using plural bolts, which are not shown in the drawings. The front end portions 42A of the left and right pair of beam mounts 42 are spaced apart in the vehicle width direction and joined to the rear face side of the brace 54 that is not shown in the drawings.

13 Operation and Effects—

Now, operation of the power unit mounting structure 50 according to the second exemplary embodiment is described.

In the power unit mounting structure 50, the brace 54 that supports the power unit 31 is disposed at the upper side relative to the pair of front side members 18 and does not link between the pair of front side members 18. Therefore, deformation of the pair of front side members 18 in the vehicle front-and-rear direction is not limited by the brace 54. Thus, a reduction in the ability of the front side members 18 to absorb a collision load when the collision load is applied in the vehicle front-and-rear direction may be suppressed.

In the power unit mounting structure 50, the brace 54 is disposed in the vicinity of a region of the power unit 31 that is at the side thereof that is further from the passenger compartment 17. Therefore, when a collision load is applied in the vehicle front-and-rear direction, a portion of the collision load is transmitted to other regions via the brace 54. Therefore, the collision load that is applied to the power unit 31 is reduced and deformation of the power unit 31 may be suppressed. That is, in the power unit mounting structure 50, both a reduction in the ability of the front side members 18 to absorb a collision load when the collision load is applied in the vehicle front-and-rear direction may be suppressed and deformation of the power unit 31 may be suppressed.

Third Exemplary Embodiment

Now, a power unit mounting structure 60 according to a third exemplary embodiment is described.

Figure 5:
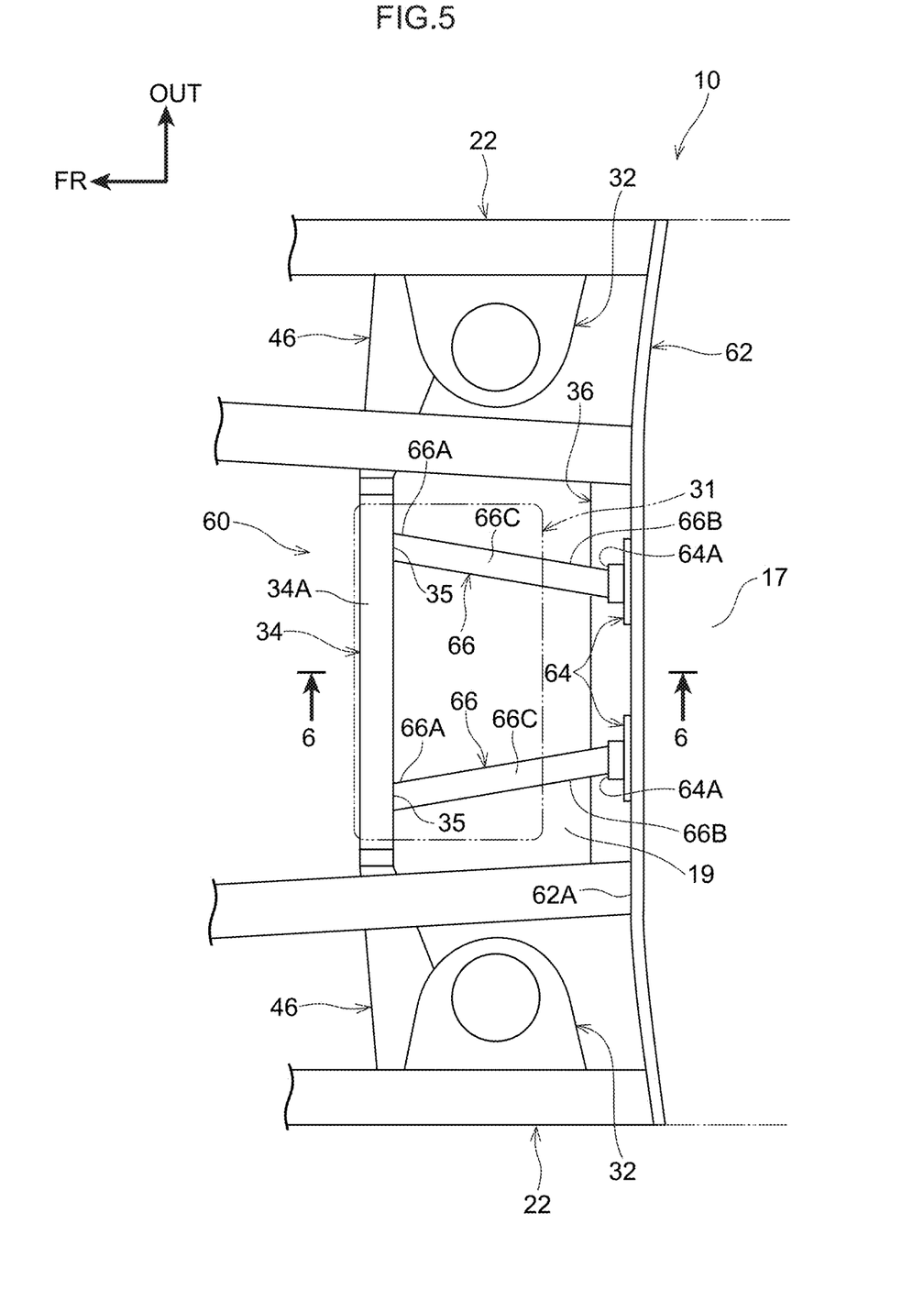
FIG. 5 is a plan view showing a power unit mounting structure according to a third exemplary embodiment and vicinity portions thereof.
Figure 6:
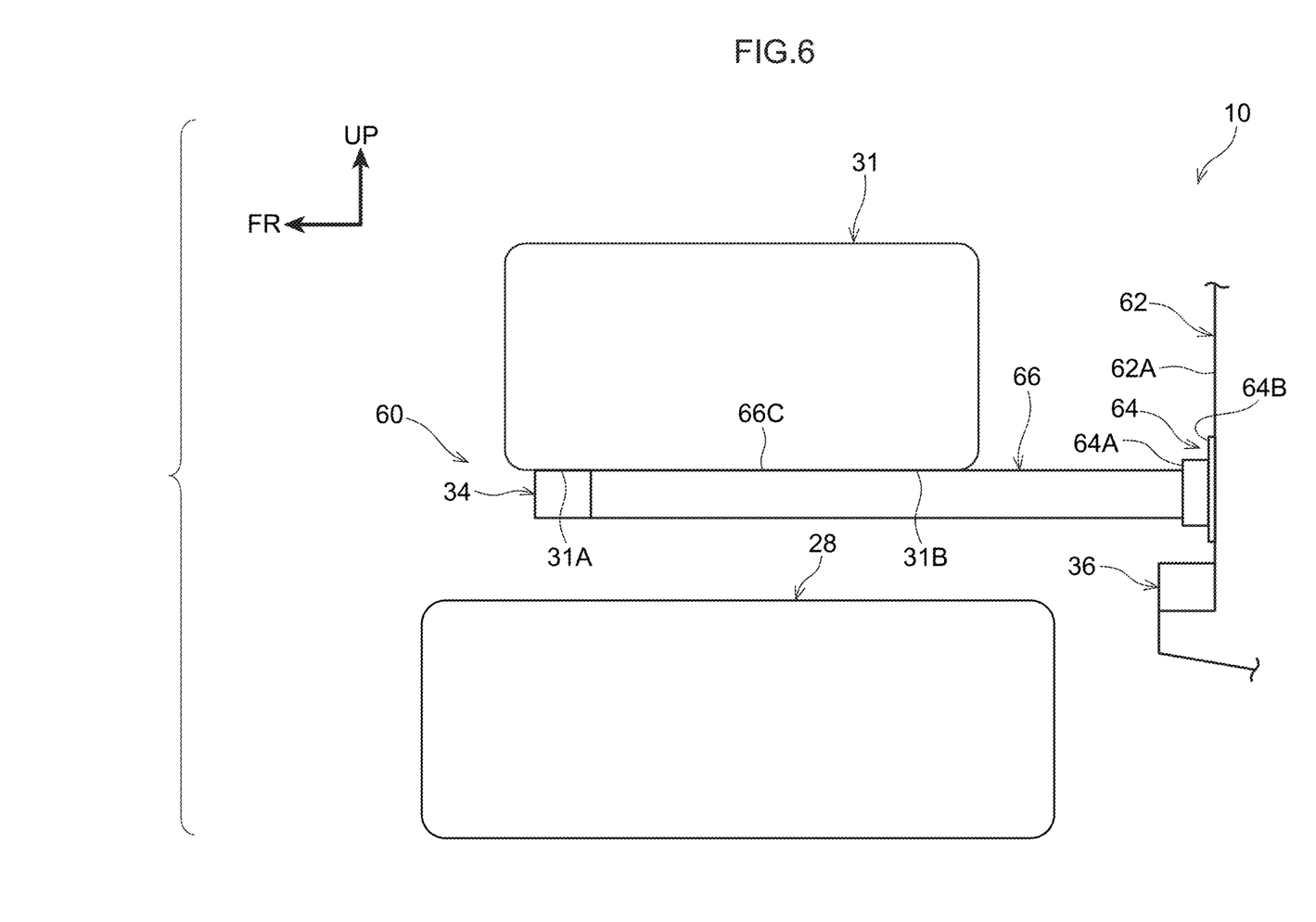
FIG. 6 is a vertical sectional view (a sectional view cut along line 6-6 in FIG. 5) of the power unit mounting structure shown in FIG. 5.

The power unit mounting structure 60 shown in FIG. 5 and FIG. 6 is provided in place of the power unit mounting structure 30 (see FIG. 1) in the vehicle 10 according to the first exemplary embodiment (see FIG. 1). Structures that are basically the same as in the vehicle 10 and the power unit mounting structure 30 are assigned the same reference symbols and descriptions thereof are not given here. The reference symbol of the vehicle is the same, "the vehicle 10". The power unit 31 and the motor 28 are shown simplified in the drawings.

The power unit mounting structure 60 shown in FIG. 5 includes, for example, the power unit 31, the left and right pair of suspension towers 32, the brace 34, a dash panel 62, attachment-receiving members 64, and beam mounts 66. The power unit mounting structure 60 is provided in the accommodation compartment 19. As shown in FIG. 6, viewed in the vehicle width direction, the front end of the power unit 31 is disposed at the rear side in the vehicle front-and-rear direction relative to the front end of the motor 28.

Dash Panel

The dash panel 62 shown in FIG. 5 is an example of the auxiliary member and a panel. The dash panel 62 extends in the vehicle vertical direction and the vehicle width direction, with a plate thickness direction in the vehicle front-and-rear direction, at the vehicle upper side relative to the suspension member 14 (see FIG. 1). The dash panel 62 divides the accommodation compartment 19 that accommodates the power unit 31 from the passenger compartment 17. That is, the accommodation compartment 19 is disposed at the vehicle front side relative to the dash panel 62.

A face at the front side in the vehicle front-and-rear direction of the dash panel 62 is referred to as "the front face 62A". Penetrating holes, which are not shown in the drawing, are formed penetrating through the dash panel 62 in the vehicle front-and-rear direction. Weld nuts, which are not shown in the drawings, are joined to peripheral edge portions at the vehicle rear sides of the penetrating holes. The dash cross-member 36 is provided at a lower portion of the dash panel 62.

Attachment-Receiving Members

The attachment-receiving member 64 shown in FIG. 6 is an example of the attachment-receiving portion. Two of the attachment-receiving members 64 are provided at the front face 62A, spaced apart in the vehicle width direction. The two attachment-receiving members 64 are arranged with left-right symmetry about the center in the vehicle width direction of the vehicle 10. More specifically, each attachment-receiving member 64 includes a joining portion 64A and a flange 64B. The joining portion 64A has a square tube shape with an axial direction in the vehicle front-and-rear direction, and the corresponding beam mount 66 is joined to the joining portion 64A. The flange 64B protrudes to outer sides from outer periphery faces of the joining portion 64A.

The flanges 64B are formed in plate shapes with a thickness direction in the vehicle front-and-rear direction. Penetrating holes, which are not shown in the drawings, are formed penetrating through the flanges 64B in the vehicle front-and-rear direction. In a state in which the aforementioned penetrating holes in the dash panel 62 and the penetrating holes in the flanges 64B are in communication, bolts are inserted into the penetrating holes and are fastened to the weld nuts that are not shown in the drawings. Thus, the flanges 64B are disposed at (fixed to) the dash panel 62.

Beam Mounts

The beam mounts 66 shown in FIG. 5 are examples of the beam member. Two of the beam mounts 66 are provided spaced apart in the vehicle width direction. The two beam mounts 66 are arranged with left-right symmetry about the center in the vehicle width direction of the vehicle 10. Each beam mount 66 is formed as a member with a substantially square tube shape that is long in one direction. Viewed in the vehicle vertical direction, the profile of the beam mount 66 is formed in a parallelogram shape. A height level of the beam mount 66 in the vehicle vertical direction is, for example, substantially the same as the height level of the brace 34 in the vehicle vertical direction.

More specifically, viewed in the vehicle front-and-rear direction, the beam mount 66 extends with an axial direction in a diagonal direction that intersects the vehicle front-and-rear direction such that one end portion of the axial direction (a front end portion 66A of the beam mount 66 in the vehicle front-and-rear direction) is disposed to the outer side in the vehicle width direction relative to the other end portion of the axial direction (a rear end portion 66B).

The two front end portions 66A are attached to the attachment-receiving portions 35 of the brace 34. More specifically, the two front end portions 66A are joined to the attachment-receiving portions 35. Meanwhile, the two rear end portions 66B are attached (joined) to the joining portions 64A of the attachment-receiving members 64. That is, the two rear end portions 66B are indirectly supported by the dash panel 62 via the attachment-receiving members 64.

Viewed in the vehicle vertical direction, the two beam mounts 66 are disposed so as to form the diagonal edges of a trapezoid of which the short base edge is at the dash panel 62 side and the long base edge is at the brace 34 side. A height level in the vehicle vertical direction of an upper face 66C of each beam mount 66 is, for example, aligned to substantially the same height level as the upper face 34A. Thus, the power unit 31 may be mounted (placed) on the beam mounts 66.

Thus, the power unit 31 is mounted at the vehicle upper side relative to the pair of front side members 18, and the power unit 31 is supported by the brace 34 and the dash panel 62 (including the beam mounts 66).

—Operation and Effects—

Now, operation of the power unit mounting structure 60 according to the third exemplary embodiment is described.

In the power unit mounting structure 60 shown in FIG. 5 and FIG. 6, the brace 34 that supports the power unit 31 is disposed at the upper side relative to the pair of front side members 18 and does not link between the pair of front side members 18. Therefore, deformation of the pair of front side members 18 in the vehicle front-and-rear direction is not limited by the brace 34. Thus, a reduction in the ability of the front side members 18 to absorb a collision load when the collision load is applied in the vehicle front-and-rear direction may be suppressed.

In the power unit mounting structure 60, the brace 34 is disposed in the vicinity of a region of the power unit 31 that is at the side thereof that is further from the passenger compartment 17. Therefore, when a collision load is applied in the vehicle front-and-rear direction, a portion of the collision load is transmitted to other regions via the brace 34. Therefore, the collision load that is applied to the power unit 31 is reduced and deformation of the power unit 31 may be suppressed. That is, in the power unit mounting structure 60, both a reduction in the ability of the front side members 18 to absorb a collision load when the collision load is applied in the vehicle front-and-rear direction may be suppressed and deformation of the power unit 31 may be suppressed.

In the power unit mounting structure 60, because the power unit 31 is supported by the brace 34 and the dash panel 62, a support range of the bottom portions 31A and 31B of the power unit 31 (see FIG. 6) is larger in the vehicle front-and-rear direction. Therefore, inclination of the central axis of the power unit 31 (the imaginary axis K extending through the center of gravity in the height direction (see FIG. 2)) relative to the vehicle vertical direction may be suppressed.

In the power unit mounting structure 60, when a collision load in the vehicle front-and-rear direction is applied to the brace 34, the beam mounts 66 brace against the collision load between the brace 34 and the dash panel 62. Consequently, deformation of the brace 34 may be suppressed, and deformation of the suspension towers 32 that the brace 34 spans between may be suppressed. Thus, a reduction in stiffness of the vehicle 10 with respect to collision loads in the vehicle front-and-rear direction may be suppressed.

In the power unit mounting structure 60, when a collision load in the vehicle front-and-rear direction is applied to one of the suspension towers 32, a portion of the applied collision load is transmitted through the brace 34 to the other suspension tower 32. Therefore, compared to a structure that does not include the brace 34, deformation of the suspension towers 32 may be suppressed, and stiffness of the suspension towers 32 with respect to collision loads in the vehicle front-and-rear direction may be raised.

The present disclosure is not limited by the exemplary embodiments described above. Below, a first variant example, a second variant example and alternative variant examples are described. Structures that are basically the same as structures in the first, second and third exemplary embodiments are assigned the same reference symbols and are not described here.

FIRST VARIANT EXAMPLE

Figure 7:
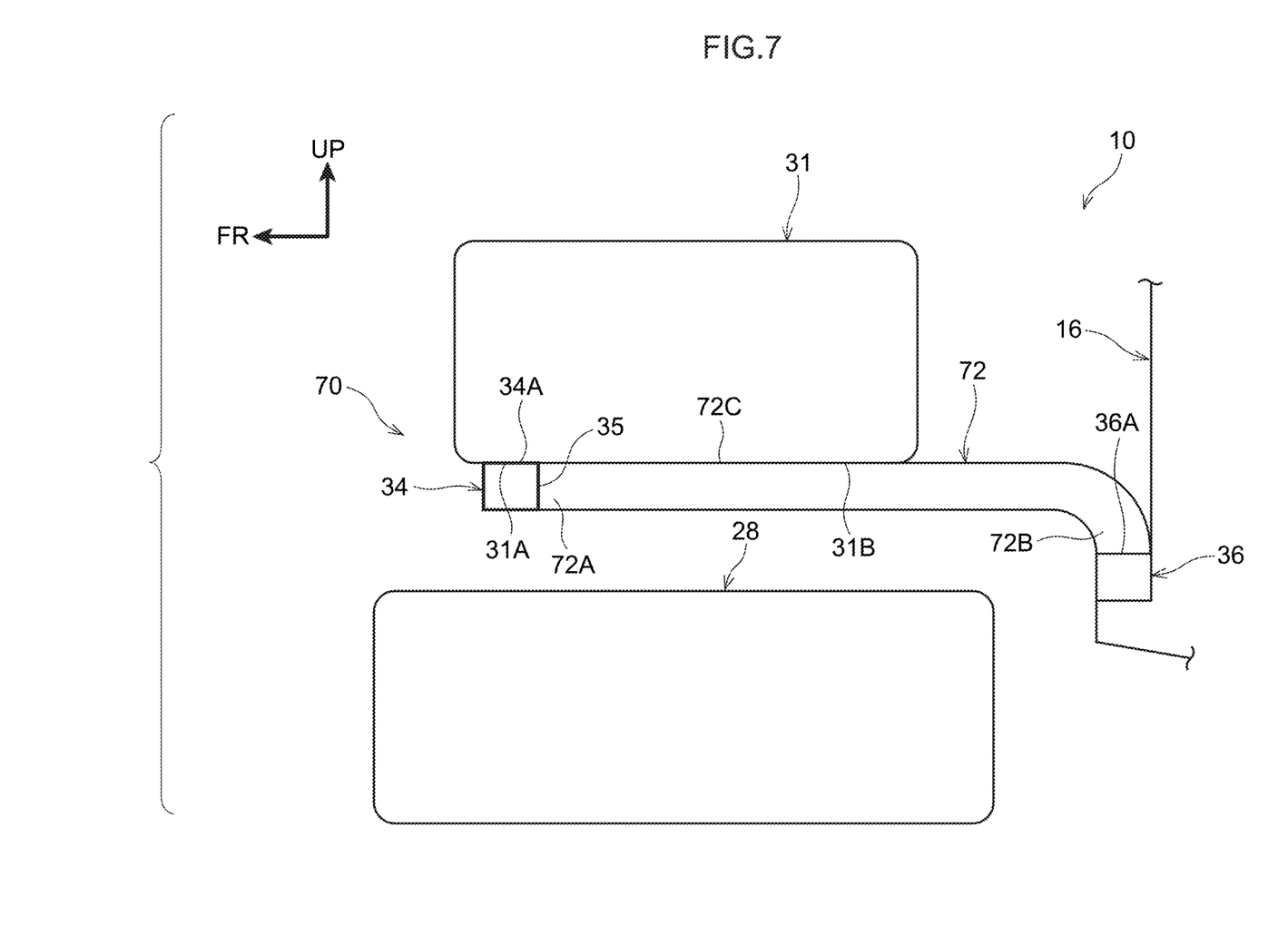
FIG. 7 is a vertical sectional view of a power unit mounting structure according to a first variant example.

FIG. 7 shows a power unit mounting structure 70 according to the first variant example. The power unit mounting structure 70 is provided with beam mounts 72 in place of the brackets 38 and beam mounts 42 (see FIG. 1) of the power unit mounting structure 30 (see FIG. 1). Apart from the beam mounts 72, structures are the same as in the power unit mounting structure 30.

The beam mounts 72 are examples of the beam member. Two of the beam mounts 72 are provided spaced apart in the vehicle width direction. The two beam mounts 72 are arranged with left-right symmetry about the center in the vehicle width direction of the vehicle 10. Each beam mount 72 is formed as a member with a substantially square tube shape that is long in one direction. A height level of the beam mount 72 in the vehicle vertical direction is, for example, substantially the same as the height level of the brace 34 in the vehicle vertical direction.

More specifically, viewed in the vehicle front-and-rear direction, the beam mount 72 extends with an axial direction in a diagonal direction that intersects the vehicle front-and-rear direction such that one end portion of the axial direction (a front end portion 72A of the beam mount 72 in the vehicle front-and-rear direction) is disposed to the outer side in the vehicle width direction relative to the other end portion of the axial direction (a rear end portion 72B). Viewed in the vehicle width direction, the beam mount 72 extends in the vehicle front-and-rear direction from the front end portion 72A to a middle portion of the beam mount 72, and the rear end portion 72B is inflected to the vehicle lower side, toward the dash cross-member 36.

The two front end portions 72A are attached (joined) to the attachment-receiving portions 35 of the brace 34. The two rear end portions 72B are attached (joined) to the upper face 36A of the dash cross-member 36. That is, the two rear end portions 72B are directly supported by the dash cross-member 36.

Viewed in the vehicle vertical direction, the two beam mounts 72 are disposed so as to form the diagonal edges of a trapezoid of which the short base edge is at the dash cross-member 36 side and the long base edge is at the brace 34 side. A height level in the vehicle vertical direction of an upper face 72C of each beam mount 72 is, for example, aligned to substantially the same height level as the upper face 34A. Thus, the power unit 31 may be mounted (placed) on the beam mounts 72, and a structure that does not employ the brackets 38 (see FIG. 1) is possible.

SECOND VARIANT EXAMPLE

Figure 8:
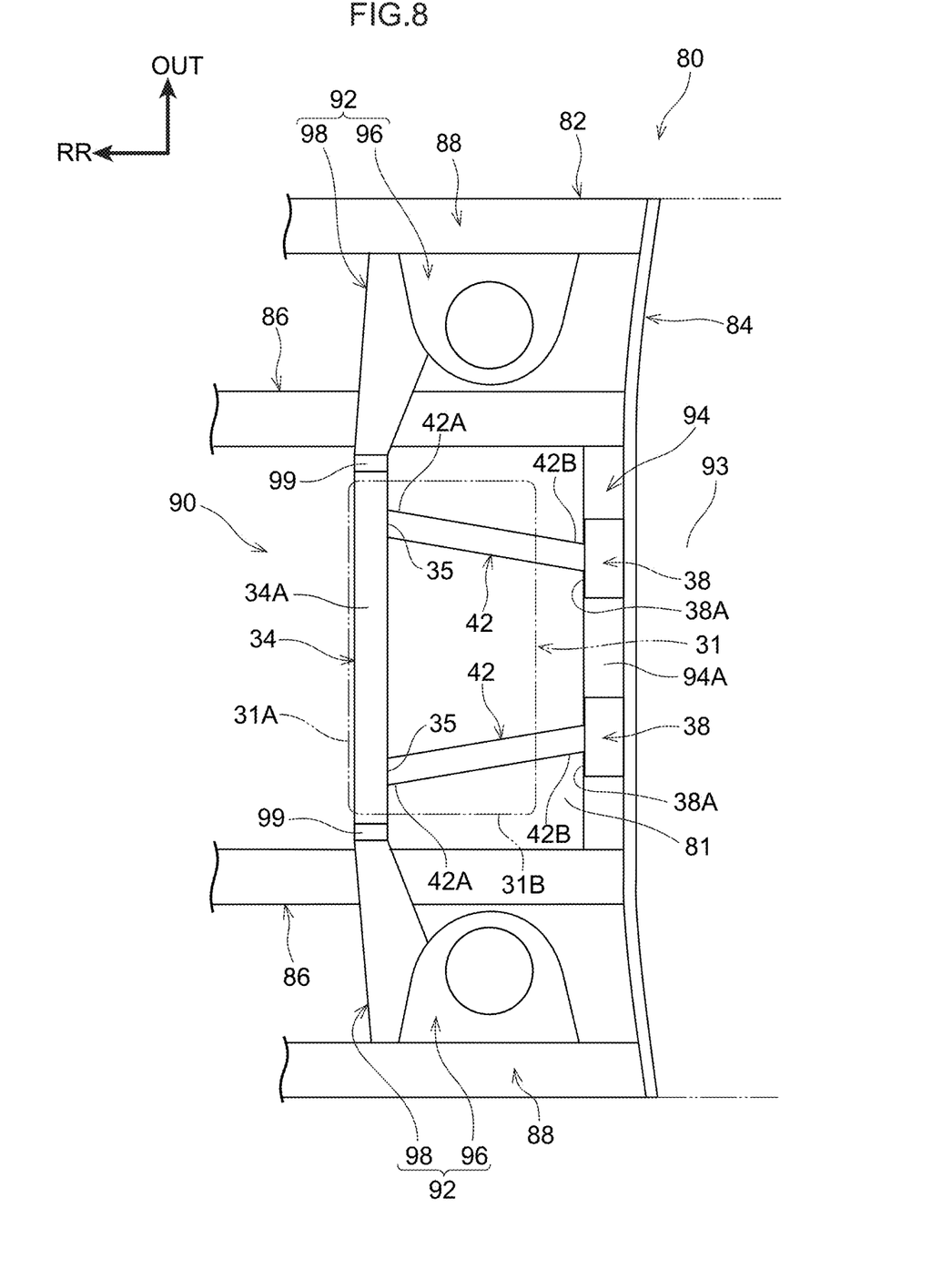
FIG. 8 is a plan view showing a power unit mounting structure according to a second variant example and vicinity portions thereof.

FIG. 8 shows principal elements of a vehicle rear portion of a vehicle 80 in which a power unit mounting structure 90 that serves as the second variant example is employed. The vehicle 80 includes a vehicle body 82 and the power unit mounting structure 90.

The vehicle body 82 includes the suspension member 14 (see FIG. 1), a separation panel 84, rear side members 86, and rear upper members 88. The power unit 31 that supplies electric power to respective parts of the vehicle 80 is mounted at the vehicle body 82.

The separation panel 84 is structured as, for example, a portion that stands toward the vehicle upper side in a region corresponding with a rear end portion in the vehicle front-and-rear direction of a room floor panel, which is not shown in the drawings. The separation panel 84 may be structured as a front end portion of a trunk floor panel, which is not shown in the drawings. The separation panel 84 extends in the vehicle vertical direction and the vehicle width direction with a plate thickness direction in the vehicle front-and-rear direction, at the vehicle upper side relative to the suspension member 14 (see FIG. 1). The separation panel 84 divides an accommodation chamber 81 that accommodates the power unit 31 from a passenger compartment 93. That is, the accommodation chamber 81 is disposed at the vehicle rear side relative to the separation panel 84, and the passenger compartment 93 is disposed at the vehicle front side relative to the separation panel 84.

The rear side members 86 are examples of the side member. A left and right pair of the rear side members 86 are spaced apart in the vehicle width direction at the vehicle rear side relative to the passenger compartment 93. Each rear side member 86 extends in the vehicle front-and-rear direction toward the vehicle rear from the separation panel 84. The rear side member 86 is a framework member with a chamber structure that is formed by extrusion molding, press machining or the like.

A left and right pair of the rear upper members 88 are spaced apart in the vehicle width direction. Each of the pair of rear upper members 88 extends in the vehicle front-and-rear direction at the vehicle upper side of the vehicle width direction outer side relative to the rear side member 86.

—Configuration of Principal Elements—

The power unit mounting structure 90 includes, for example, the power unit 31, a left and right pair of suspension towers 92, the brace 34, a rear cross-member 94, the brackets 38, and the beam mounts 42. The power unit mounting structure 90 is provided in the accommodation chamber 81.

The suspension towers 92 are examples of the upper side vehicle body structural member. Viewed in the vehicle vertical direction, the suspension towers 92 are provided at the vehicle width direction inner sides relative to the left and right rear upper members 88 but at the vehicle width direction outer sides relative to the rear side members 86. The suspension towers 92 extend in the vehicle vertical direction. In other words, the suspension towers 92 are spaced apart in the vehicle width direction and extend in the vehicle vertical direction. The suspension towers 92 retain upper end portions of suspensions that support rear wheels, which are accommodated in wheel houses that are not shown in the drawings.

At each of the left side and the right side relative to the center in the vehicle width direction of the vehicle 80, a middle portion and upper portion in the vehicle vertical direction of the suspension tower 92 is disposed at the upper side relative to the rear side member 86. Each suspension tower 92 is formed as an integral member by, for example, welding of a main body portion 96 and an arm portion 98.

The main body portion 96 is a portion that retains an upper end portion of the suspension that is not shown in the drawings. The main body portion 96 bulges toward the inner side in the vehicle width direction from the rear upper member 88. The arm portion 98 extends toward the vehicle width direction inner side from a region of a side face of the main body portion 96 at the rear side thereof in the vehicle front-and-rear direction. The left and right pair of arm portions 98 are arranged symmetrically with respect to the center in the vehicle width direction of the vehicle 80. The left and right pair of arm portions 98 are spaced apart in the vehicle width direction. A spacing distance thereof is smaller than a length in the vehicle width direction of the brace 34.

Brace attachment portions 99 are formed at respective end portions of the left and right pair of arm portions 98, which end portions oppose one another in the vehicle width direction. Viewed in the vehicle vertical direction, the left and right pair of brace attachment portions 99 are disposed at, for example, positions at the front side relative to rear end portions of the pair of rear side members 86, at the inner sides in the vehicle width direction relative to the pair of rear side members 86. Viewed in the vehicle front-and-rear direction, the left and right pair of brace attachment portions 99 are disposed at the upper side relative to the pair of rear side members 86.

The rear cross-member 94 is an example of the auxiliary member and the cross-member. The rear cross-member 94 is provided at (joined to) a lower portion of the separation panel 84 that is at the lower side relative to the center of the separation panel 84 in the vehicle vertical direction. The rear cross-member 94 is formed as a hollow member with a chamber cross section. The rear cross-member 94 extends in the vehicle width direction from a front end portion of the rear side member 86 at one side in the vehicle width direction (the right side) to a front end portion of the rear side member 86 at the other side (the left side). That is, when viewed in the vehicle vertical direction, the rear cross-member 94 extends in the vehicle width direction at the side of the brace 34 that is closer to to the passenger compartment 93 in the vehicle front-and-rear direction.

The two end portions in the vehicle width direction of the rear cross-member 94 are connected to the vehicle width direction inner side faces of the rear end portions of the pair of rear side members 86. Therefore, the rear cross-member 94 suppresses inclination of the pair of rear side members 86 to the vehicle width direction inner sides thereof.

The brace 34 spans between the pair of suspension towers 92 (the brace attachment portions 99) at the vehicle upper side relative to the pair of rear side members 86. A rear portion in the vehicle front-and-rear direction of the power unit 31 is placed on the upper face 34A of the brace 34. That is, the brace 34 supports a bottom portion 31A of the power unit 31 at the side of the power unit 31 that is further in the vehicle front-and-rear direction from the passenger compartment 93.

Two of the brackets 38 are provided at an upper face 94A of the rear cross-member 94, spaced apart in the vehicle width direction. The two brackets 38 stand toward the vehicle upper side from the rear cross-member 94. The two brackets 38 are arranged with left-right symmetry about the center in the vehicle width direction of the vehicle 80.

Two of the beam mounts 42 are provided spaced apart in the vehicle width direction. The two beam mounts 42 are arranged with left-right symmetry about the center in the vehicle width direction of the vehicle 80. The two front end portions 42A are attached to the attachment-receiving portions 35 of the brace 34. The two rear end portions 42B are attached (joined) to upper portions of the front face 38A. In other words, the two rear end portions 42B are indirectly supported by the rear cross-member 94 via the brackets 38. Thus, the power unit 31 is mounted at the vehicle upper side relative to the pair of rear side members 86. The power unit 31 is supported by the brace 34 and the rear cross-member 94.

In the power unit mounting structure 90, the brace 34 that supports the power unit 31 is disposed at the upper side relative to the rear side members 86 and does not link between the pair of rear side members 86. Therefore, deformation of the pair of rear side members 86 in the vehicle front-and-rear direction is not limited by the brace 34. Thus, a reduction in the ability of the rear side members 86 to absorb a collision load when the collision load is applied in the vehicle front-and-rear direction may be suppressed.

In the power unit mounting structure 90, the brace 34 is disposed in the vicinity of a region of the power unit 31 that is further from the passenger compartment 93. Therefore, when a collision load (of a rear collision) is applied in the vehicle front-and-rear direction, a portion of the collision load is transmitted to other regions via the brace 34. Therefore, the collision load that is applied to the power unit 31 is reduced and deformation of the power unit 31 may be suppressed. That is, in the power unit mounting structure 90, both a reduction in the ability of the rear side members 86 to absorb a collision load when the collision load is applied in the vehicle front-and-rear direction may be suppressed and deformation of the power unit 31 may be suppressed.

ALTERNATIVE VARIANT EXAMPLES

In the power unit mounting structures 30, 50 and 70, the power unit 31 may be supported by the brace 34 alone.

In the power unit mounting structure 60, the brace 34 may span between the apron upper members 22 in the vehicle width direction. Further in the power unit mounting structure 60, the power unit 31 may be supported by the brace 34 alone.

In the power unit mounting structure 90, the brace 34 may span between the rear upper members 88 in the vehicle width direction. In this case, it is sufficient that portions at which the brace 34 is attached are disposed at the lower side relative to the rear upper members 88 but at the upper side relative to the rear side members 86. Further in the power unit mounting structure 90, the brackets 38 need not be employed; front end portions in the vehicle front-and-rear direction of the beam mounts 42 may be inflected and attached to the rear cross-member 94. Alternatively in the power unit mounting structure 90, the front end portions of the beam mounts 42 may be attached to attachment-receiving portions of the separation panel 84, which are not shown in the drawings, and the front end portions of the beam mount 42 may be supported by the separation panel 84. In the power unit mounting structure 90, the power unit 31 may be supported by the brace 34 alone.

The number of the brace 34 is not limited to one but may be two or more. Attachment portions of the brace 34 are not limited to one each at left and right but may be split into two or more each at left and right. It is sufficient that the cross section of the brace 34 includes an upper face to serve as a placing surface; the cross section is not limited to a square shape but may be a triangular shape or a polygonal shape with five sides or more. Further, the upper face of the brace 34 may be formed as the placing surface by a portion of the outer periphery of a circular column shape being cut away.

It is sufficient that the beam mounts 42, 66 or 72 include upper faces to serve as placing surfaces; cross sections thereof are not limited to square shapes but may be triangular shapes or polygonal shapes with five sides or more. Further, upper faces of the beam mounts 42, 66 or 72 may be formed as placing surfaces by portions of the outer peripheries of circular column shapes being cut away. There may be one beam mount 42, 66 or 72, and there may be three or more.

At each bracket 38, a flange portion may be formed protruding in the vehicle front-and-rear direction from the upper end of the bracket 38, and a portion of the power unit 31 may be placed on this flange portion. A number of the brackets 38 may be the same as the number of beam mounts 42 or 66, and may be a different number. The number of the brackets 38 may be one and may be three or more.

The brace 34 is not limited to spanning between the arm portions 46 of the suspension towers 32 but may span between the main body portions 44.

At each beam mount 72, the rear end portion 72B is not limited to being inflected but may be bent in a substantial crank shape, and a rear end portion thereof may be joined to the front face of the dash cross-member 36. Alternatively, if a position of the dash cross-member 36 in the vehicle vertical direction is high, the beam mount 72 may be formed in a linear shape and attached to the dash cross-member 36.

Exemplary embodiments of the present disclosure are described above. However, the present disclosure is not limited by these descriptions and it will be clear that numerous modifications beyond these descriptions may be embodied within a technical scope that does not depart from the gist of the disclosure.

What is claimed is:

1. A power unit mounting structure, comprising:
   a pair of side members spaced apart in a vehicle width direction at a vehicle front side or a vehicle rear side relative to a passenger compartment;
   a power unit that is mounted at an upper side in a vehicle vertical direction relative to the pair of side members;
   a pair of upper side vehicle body structural members, each having at least a portion that is disposed at an outer side in the vehicle width direction at the upper side in the vehicle vertical direction relative to the pair of side members; and
   a brace that spans between the pair of upper side vehicle body structural members at the upper side in the vehicle vertical direction relative to the pair of side members, the brace supporting a bottom portion of the power unit at a side thereof that is furthest from the passenger compartment in a vehicle front-rear direction,
   wherein the upper side vehicle body structural members have arms extending toward each other in the vehicle width direction, the brace being sandwiched between the arms in the vehicle width direction.

2. The power unit mounting structure according to claim 1, further comprising:
   an auxiliary member that, when viewed from the vehicle vertical direction, extends in the vehicle width direction at a side of the brace that is closest to the passenger compartment in the vehicle front-and-rear direction; and
   a beam member that extends in the vehicle front-rear direction, one end portion of the beam member in an axial direction being attached to the brace and another end portion of the beam member in the axial direction being supported by the auxiliary member,
   wherein the power unit is supported by the brace and the auxiliary member.

3. The power unit mounting structure according to claim 2, wherein
   the auxiliary member is a cross-member provided at a lower portion in the vehicle vertical direction of a panel, the panel dividing an accommodation compartment, which accommodates the power unit, from the passenger compartment,
   the power unit mounting structure further comprises a bracket provided at the cross-member, the bracket standing upright toward the vehicle upper side from the cross-member, and
   said another end portion of the beam member in the axial direction is attached to the bracket.

4. The power unit mounting structure according to claim 2, wherein
   the auxiliary member is a panel dividing an accommodation compartment, which accommodates the power unit, from the passenger compartment, an attachment-receiving portion being provided at the panel, and
   a rear end portion of the beam member is attached to the attachment-receiving portion.

5. The power unit mounting structure according to claim 1, wherein
   the upper side vehicle body structural members further include a pair of suspension towers that are spaced apart in the vehicle width direction and extend in the vehicle vertical direction, and
   the brace spans between the pair of suspension towers.

6. The power unit mounting structure according to claim 3, further comprising a further bracket provided at the cross-member and standing upright toward the vehicle upper side from the cross-member,
   wherein the bracket and the further bracket are provided at an upper face of the cross-member and spaced apart in the vehicle width direction.

7. The power unit mounting structure according to claim 6, wherein the bracket and the further bracket are arranged with left-right symmetry about a center of the vehicle in the vehicle width direction.

8. The power unit mounting structure according to claim 3, wherein the bracket has a hollow cuboid shape.

9. A power unit mounting structure, comprising:
   a pair of side members spaced apart in a vehicle width direction at a vehicle front side or a vehicle rear side relative to a passenger compartment;
   a power unit that is mounted at an upper side in a vehicle vertical direction relative to the pair of side members;
   a pair of upper side vehicle body structural members, each having at least a portion that is disposed at an outer side in the vehicle width direction at the upper side in the vehicle vertical direction relative to the pair of side members; and
   a brace that spans between the pair of upper side vehicle body structural members at the upper side in the vehicle vertical direction relative to the pair of side members, the brace supporting a bottom portion of the power unit at a side thereof that is furthest from the passenger compartment in a vehicle front-rear direction; and
   an auxiliary member extending in the vehicle width direction, the auxiliary member having two end portions directly connected to the pair of side members in the vehicle width direction, respectively.

10. The power unit mounting structure according to claim 9, wherein the upper side vehicle body structural members have arms extending toward each other in the vehicle width direction, the brace being sandwiched between the arms in the vehicle width direction.

* * * * *